United States Patent [19]

Bringol

[11] 4,270,124

[45] May 26, 1981

[54] ALPHANUMERIC CRT DISPLAY SYSTEM WITH UNITARY CHARACTER FORMATION AND REFRESH

[75] Inventor: Charles R. Bringol, Austin, Tex.

[73] Assignee: International Business Machines Corporation, Armonk, N.Y.

[21] Appl. No.: 46,877

[22] Filed: Jun. 8, 1979

[51] Int. Cl.$^3$ .............................................. G06F 3/14

[52] U.S. Cl. .................................. 340/731; 340/748; 340/744; 178/30

[58] Field of Search ............... 340/748, 731, 723, 744, 340/749, 750; 178/15, 30

[56] References Cited

U.S. PATENT DOCUMENTS

| | | | |
|---|---|---|---|
| 3,423,749 | 1/1969 | Newcomb | 340/748 |
| 3,428,851 | 2/1969 | Greenblum | 340/748 |
| 3,437,873 | 4/1969 | Eggert | 340/731 |
| 3,568,178 | 3/1971 | Day | 340/748 |
| 3,774,161 | 11/1973 | Chambers | 340/748 |
| 4,050,563 | 9/1977 | Menhennett | 340/731 |
| 4,089,008 | 5/1978 | Suga et al. | 340/731 |
| 4,107,664 | 8/1978 | Marino | 340/731 |
| 4,107,786 | 8/1978 | Masaki et al. | 340/731 |
| 4,121,228 | 10/1978 | Cowe et al. | 340/731 |

*Primary Examiner*—Marshall M. Curtis
*Attorney, Agent, or Firm*—J. B. Kraft

[57] ABSTRACT

A cathode ray tube display system is provided for displaying a block comprising a plurality of alphanumeric characters arranged in a plurality of character lines having cyclic refresh means wherein each unitary or whole character is refreshed before the next succeeding character is refreshed. The system comprises means for repetitive raster scanning of the CRT tube in a raster of horizontal passes each traversing the whole one of said character; each of these horizontal passes comprises a subraster of vertical scan lines wherein each character position in said character line being traversed is scanned by a group of these vertical scan lines, and means are provided for modulating the light intensity along the vertical scan lines of each of these groups to selectively provide an alphanumeric character at the position being scanned by the group of scan lines.

5 Claims, 22 Drawing Figures

ALPHANUMERIC CRT DISPLAY SYSTEM WITH UNITARY CHARACTER FORMATION AND REFRESH

DESCRIPTION

BACKGROUND OF THE INVENTION

This invention relates to CRT display systems for alphanumeric text processing. More particularly, it relates to a CRT display wherein each unitary or whole character is formed and cyclically refreshed as a unit, i.e., before the next succeeding character is either formed or refreshed.

My copending application, "A Text Processing and Display System with Means for Rearranging the Spatial Format of a Selectable Section of Display Data", Ser. No. 46,894, filed on the same date as the present application provides a text processing and display system wherein any portion or section of a block or page of displayed alphanumeric information may be defined and then treated as a separate entity for reformatting purposes, i.e., the margins of the defined sections may be justified, adjusted or the section may be moved in much the same manner as would the overall page or block. The system of said copending application accomplishes this by providing a text processing and display system which comprises a display device which simultaneously displays a block or page having a plurality of lines of alphanumeric characters in ordered display positions, sequentially accessible storage means for storing coded data representations of said displayed characters in a sequence of storage positions spatially corresponding to the positions of the characters in the display block, repetitive display scanning means for traversing said ordered character display positions in successive lines on said display device, and means for sequentially accessing the data representations for each character to be displayed from the storage means in synchronization with the display scanning means. Finally, means are required for applying to the display device signals representative of the whole or unitary character to be displayed at a particular display position prior to the movement of the display scanning means to the next display position so that each whole or unitary character in the displayed block is formed and subsequently refreshed before the next character is so formed and/or refreshed.

The present invention provides the CRT display apparatus wherein said whole or unitary character is formed and/or refreshed before the next whole or unitary character is so formed and/or refreshed. In addition, the present invention directed toward the satisfaction of other existing needs in the alphanumeric CRT display art.

In displays associated with word processing systems wherein the final copy produced by the processing system printer is proportionally spaced, i.e., the alphanumeric characters to be printed and consequently to be displayed are of varying character width and have variable spacing between characters, it would be desirable to have relatively simple and effective apparatus utilizing a minimum of support logic and memory to display such alphanumeric information in the same variable space and size pattern that it will have on the final printed copy.

Likewise, since it is at times desirable in final printed copy to have characters of varying pitch on the same page and even on the same line, there is a need for simple and effective display apparatus for effecting such changes in pitch between displayed alphanumeric characters on the same page or line.

BRIEF DESCRIPTION OF THE PRESENT INVENTION

Accordingly, it is a primary object of the present invention to provide an alphanumeric display wherein each unitary or whole character to be displayed at a particular character position is either initially formed or subsequently refreshed before the next succeeding character is thus initially formed or subsequently refreshed.

It is a further object of the present invention to provide a raster scan alphanumeric CRT display wherein each unitary or whole character to be displayed at a particular character position is initially formed or subsequently refreshed before the next succeeding character is thus initially formed or subsequently refreshed.

It is another object of the present invention to provide an alphanumeric CRT display which efficiently displays alphanumeric characters having varying width and varying spacing thereinbetween.

It is an even further object of the present invention to provide an alphanumeric CRT display on which characters or words of differing pitches may be effectively displayed on the same displayed page or line in said page.

It is yet another object of the present invention to provide an alphanumeric CRT display apparatus in which width and height of characters may be readily and effectively varied.

The present invention accomplishes the above objects by providing in its broadest aspects, a CRT display system for displaying a block or page comprising a plurality of alphanumeric characters arranged in a plurality of character lines having cyclic refresh means wherein each whole or unitary character is refreshed before the next succeeding whole or unitary character is refreshed; the system comprises means for repetitive raster scanning of the CRT in a raster of horizontal passes, each traversing a whole one of said character lines, and each of said passes comprising a subraster of vertical scan lines wherein each character position in said character line being traversed is scanned by a group of said vertical scan lines; the system further includes means for modulating the light intensity along the vertical scan lines of each of said groups to selectively provide an alphanumeric character at the position being scanned by the group.

This CRT display system functions in combination with sequentially accessible storage means for storing coded data representations of the displayed characters in a sequence of storage positions corresponding to the positions of the character in the displayed page or block and means for sequentially accessing these coded data representations for each character to be displayed from the storage means and synchronization with the above described raster scanning means traversing the position at which a particular character is to be displayed. Means responsive to the access data apply to the cathode ray tube display signals representative of the whole or unitary character to be displayed at a particular character position prior to the movement of the raster scanning means to the next character position. Then, means responsive to such applied signals modulate the light intensity along the vertical scan lines of each of the groups of such vertical scan lines to provide the displayed character at the particular position, whereby each unitary or whole character in the page or block is either initially formed or subsequently refreshed before the next succeeding character is thus initially formed or subsequently refreshed.

In accordance with the present invention, proportionally spaced characters having variable width are provided by varying the number of vertical scan lines in the group from which a particular character is being formed.

In addition in accordance with the present invention, the pitch or horizontal dimension of the alphanumeric characters being displayed may be varied by varying the horizontal displacement between the vertical scan lines and the group forming the alphanumeric characters. In addition, means are provided for varying the height of the characters through varying the height of the vertical scan line in the group from which the alphanumeric character is formed.

BRIEF DESCRIPTION OF THE DRAWINGS

Referring now to the drawings, wherein a preferred embodiment of the invention is illustrated, and wherein like reference numerals are used throughout to designate like parts.

DESCRIPTION OF THE PREFERRED EMBODIMENT

As stated hereinabove, the present CRT display system is particularly applicable as the display for my copending application, "A Text Processing and Display System with Means for Rearranging the Spatial Format of a Selectable Section of Displayed Data", Ser. No. 46,894. In illustrating the practice of the present invention, it will be described with reference to the word processing system of said copending application, all portions of which are hereby incorporated by reference. The text processing and display system of said copending application utilizes a memory organization which provides sequentially accessible storage means for storing coded data representations of a block or page of alphanumeric characters displayed on a CRT; in the sequentially accessible storage means, the coded data representations of the respective displayed characters must be in a sequence of storage positions spatially corresponding to the positions of the characters in the block or page being displayed.

Figure 1:
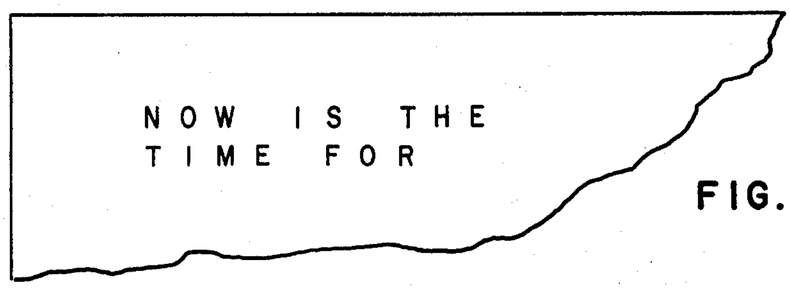
FIG. 1 is a diagrammatic illustration of alphanumeric information on the CRT of the present invention.

With respect to FIGS. 1, 2, 3 and 4, there will be described both a generalized and particular embodiment for implementing the organization of the sequentially accessible storage means in accordance with said copending application. FIG. 1 shows a part of a CRT on which a part of a page of alphanumeric data is being displayed. FIG. 4 illustrates a generalized storage organization providing sequentially accessible storage means for storing the coded data representation of the characters displayed in the CRT of FIG. 1 in a sequence of storage positions spatially corresponding to the positions of said characters in the displayed block in the CRT of FIG. 1. For purposes of illustration, let us assume that the character "N" on the CRT of FIG. 1 is in the fourth position of the third line and that each line on the display has 100 character positions. For such a case, the designation "spc (203)" in the sequentially accessible storage means of FIG. 4 means proceed for 203 spaces, i.e., two lines of 100 spaces each plus three spaces at which point the coded data representation for the character "N" will be sequenced which, in turn, utilizing the system to be hereinafter described in detail, will apply to the display device signals representative of the character "N" in synchronization with the scanning means for the CRT reaching the position for the character "N" on the CRT so that the character "N" is then refreshed. This is next followed by accessing the coded data representations of the characters "O" and "W", respectively, FIG. 4, and the refreshing of these characters in synchronization with the scanning of the CRT.

Figure 2:
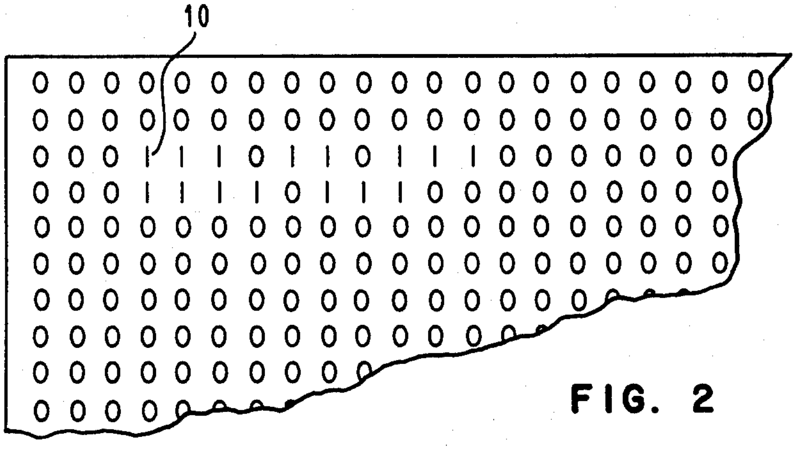
FIG. 2 is a diagrammatic illustration of matrix storage means associated with the CRT storing positional data corresponding to the position of the displayed alphanumeric characters of FIG. 1.
Figure 3:
FIG. 3 is a diagrammatic illustration of the sequentially accessible storage means associated with the matrix storage means for storing the coded data representation of the displayed characters in sequence.
Figure 4:
FIG. 4 is a diagrammatic illustration of sequentially accessible storage means which may be used alternatively to the combination of storage means of FIGS. 2 and 3 for the storage of coded data representation of the displayed character in a sequence of storage positions spatially corresponding to the positions of the character in the display block of FIG. 1.

In accordance with a more particular embodiment in said copending application as illustrated in FIGS. 2 and 3, the memory organization providing the sequentially accessible storage means for storing the coded data representations of the displayed characters is divided into two coacting memory units: a matrix storage means which stores data only representative of the positions of the displayed characters as shown in FIG. 2 wherein the positions of the "1" bits spatially correspond to the positions of the respective alphanumeric characters being displayed in the CRT of FIG. 1. In operation, as will be hereinafter described in greated detail, the positional memory matrix of FIG. 2 is accessed in synchronization with a repetitive scanning of the CRT to refresh the displayed character, e.g., when the CRT reaches the character "N", bit 10 is accessed in the memory matrix of FIG. 2; this in turn results in the accessing of the coded data representation 11 for the character "N" from the storage means shown in FIG. 3 in which the coded representations of the displayed characters are stored in the same sequence as the positional storage locations in FIG. 2 and consequently in the same sequence as the characters scanned on the display of FIG. 1. Of course, in the sequentially accessible memory of FIG. 3, there is no positional information which is provided solely by the positional matrix FIG. 2 which coacts with the storage means illustrated in FIG. 3 as will be hereinafter described.

Figure 5:
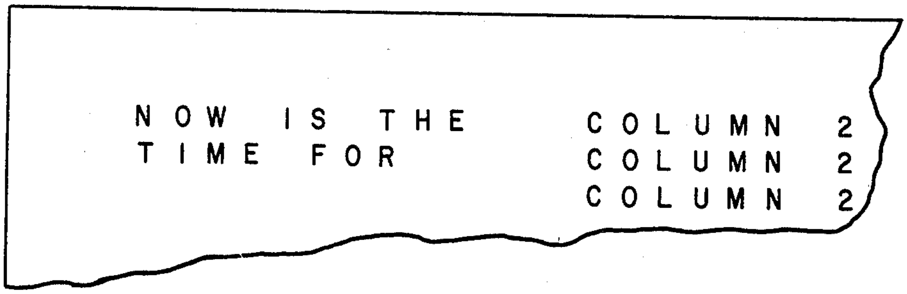
FIG. 5 is a diagrammatic illustration of alphanumeric characters arranged in columns on a CRT display of the present invention.
Figure 6:
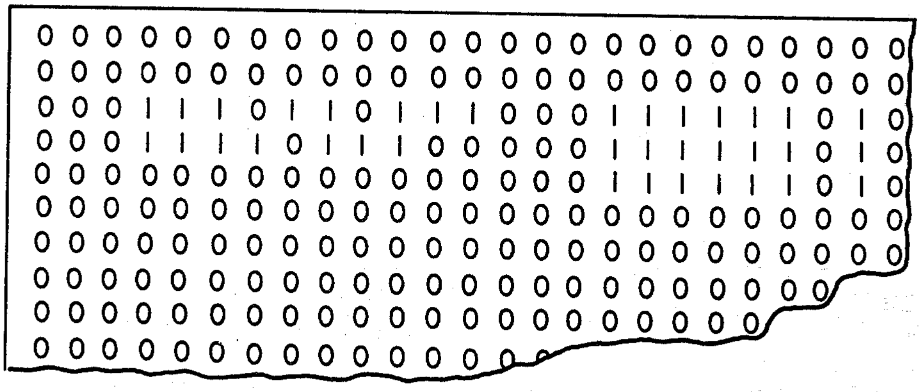
FIG. 6 is a diagrammatic illustration of matrix storage means associated with a CRT storing positional data corresponding to the positions of the displayed alphanumeric characters of FIG. 5.
Figure 7:
FIG. 7 is a diagrammatic illustration of the sequentially accessible storage means associated with the matrix storage means for storing the coded data representations of the displayed characters in sequence.

The spatial correspondent of the coded data representation of alphanumeric characters in the memory with the actual alphanumeric characters being displayed on the CRT is illustrated in FIGS. 5, 6, and 7 for a case where the alphanumeric material being displayed has a columnar arrangement. Utilizing the specific embodiment of the copending application, the positional information stored in the matrix shown in FIG. 6 directly corresponds to the columnar arrangement of the alphanumeric data in FIG. 5. Accordingly, using the circuit hardware which will be hereinafter described, the positional "1" bits are accessed out of the storage matrix, FIG. 6 in synchronization with the scanning of the CRT display of FIG. 6. Consequently, the coded data representation of the alphanumeric characters being displayed will be accessed from a sequential memory FIG. 7 line by line traversing the whole line instead of column by column, i.e., as in prior art accessing systems wherein the coded data representations for all of the lines in the first column are accessed before accessing the coded data representation of the lines in the second column.

Figure 8:
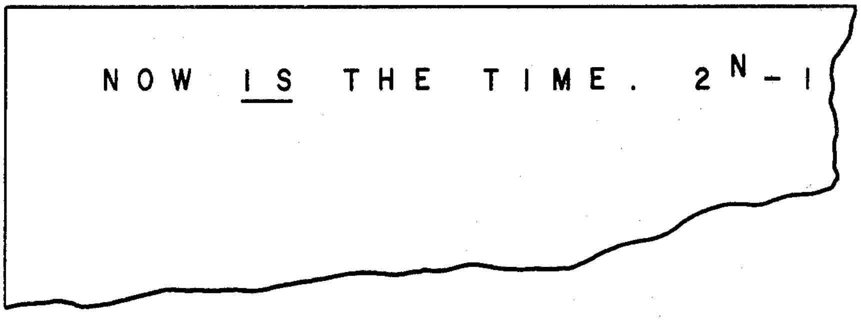
FIG. 8 is a diagrammatic illustration respectively corresponding to the illustration of FIG. 1 except that the attributes related to the coded characters are stored in the sequentially accessible memories of FIGS. 10 and 11.
Figure 9:
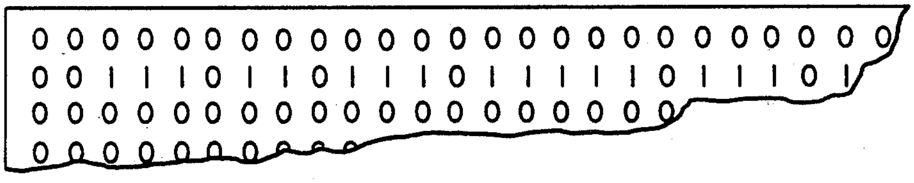
FIG. 9 is a diagrammatic illustration respectively corresponding to the illustration of FIG. 2 except that the attributes related to the coded characters are stored in the sequentially accessible memories of FIGS. 10 and 11.
Figure 10:
FIG. 10 is a diagrammatic illustration respectively corresponding to the illustration of FIG. 3 except that the attributes related to the coded characters are stored in the sequentially accessible memories of FIGS. 10 and 11.

With respect to FIGS. 8–11, some illustrations will be given of how the present system handles character attributes such as underscoring or the raising of a character above or below the character line. In the CRT of FIG. 8, the displayed alphanumeric data contains underscoring under the word "is" and a raised exponential "N" associated with the digit "2". Where the combination of positional matrix, FIG. 9, and sequentially accessible storage means for the coded data representations of the characters, FIG. 10, are used, information concerning attributes of characters is stored only in association with the coded data which is sequentially accessed, FIG. 10. For example, for underscoring the word "is", a begin underscore code (BUS) is stored before the wored "is" and an end underscore code (EUS) is stored after the word "is". For the raised "N" the code reverse half index (RHI) is used before "N" and a code half index (HI) is used after the "N" to reindex into the character line.

Figure 11:
FIG. 11 is a diagrammatic illustration respectively corresponding to the illustration of FIG. 4 except that the attributes related to the coded characters are stored in the sequentially accessible memories of FIGS. 10 and 11.

On the other hand, as shown in FIG. 11 where the spatial the information as well as the coded data representation for the characters is stored in a single sequentially accessible storage means, then the coded data representing the various character attributes, e.g., BUS, EUS, RHI, or HI are stored similarly associated with the coded representations of the characters being displayed.

GENERAL DESCRIPTION OF CRT CONTROL LOGIC

The present apparatus operates so as to apply to the CRT, signals representative of the whole character to be displayed at a particular display position prior to the movement of the scanning means to the next display or character position. The basic control logic is shown in FIGS. 18A and 18B.

Figure 15:
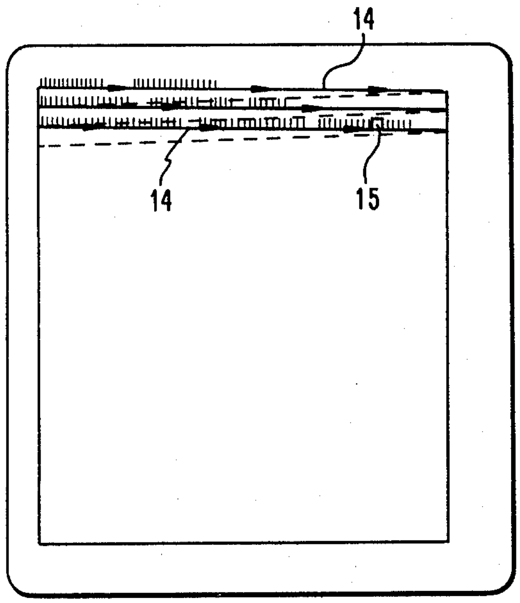
FIG. 15 is a diagram illustrating the direction of the scanning electron beam as it traverses the CRT when utilizing the subraster scanning or micro-scanning approach of the present invention.
Figure 16:
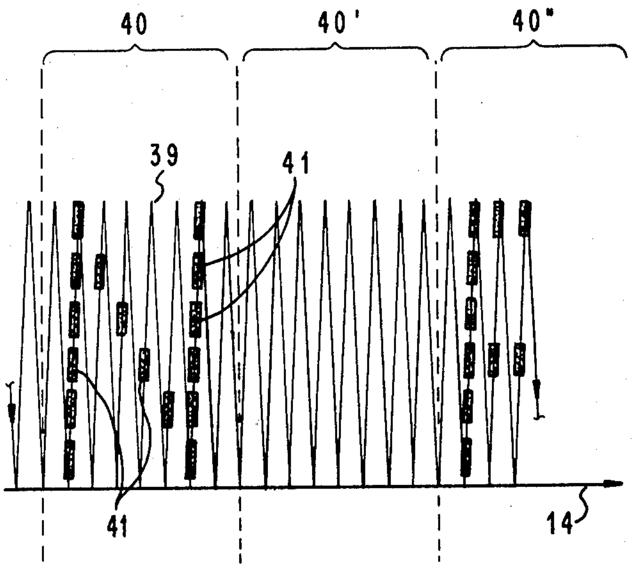
FIG. 16 is an enlarged diagram of a character position area 15, FIG. 15, to illustrate the micro-scan or subraster scan implementation of the present invention in the display of characters.

The system is controlled by any conventional microprocessor 12 which will provide the requisite data to be hereinafter described. The ultimate signals controlling the main deflection of the beam of CRT 13 is applied via lines 14 and 15 to control the main X-axis and Y-axis deflection yokes of the CRT. The logic shown in FIGS. 18A and 18B will cause the scanning electron beam of the CRT to move from the left to right as diagrammatically shown in FIG. 15. In FIG. 15 each line 14 of the main deflection path corresponds to a line containing a plurality of character positions and forming a part of an overall displayed page. In addition, as will be described, signals at a higher frequency rate are applied to micro deflection means in order to generate a micro-raster or a subraster under the control of the signals provided by the logic in FIGS. 17A and 18B; this micro-raster scan which provides the particular character is shown in FIG. 16 to produce the displayed character "N". The "N" is produced by the video which is controlled from a character generator in synchronization with the micro-raster to produce the character. In other words, when a particular main deflection scan line 14 reaches a character position 15, a character such as illustrated in FIG. 16 will be completely generated before the main line scan 14 reaches the next character position.

CONTROL LOGIC FOR SEQUENTIALLY ACCESSING AND DISPLAYING CHARACTERS

Figure 18A:
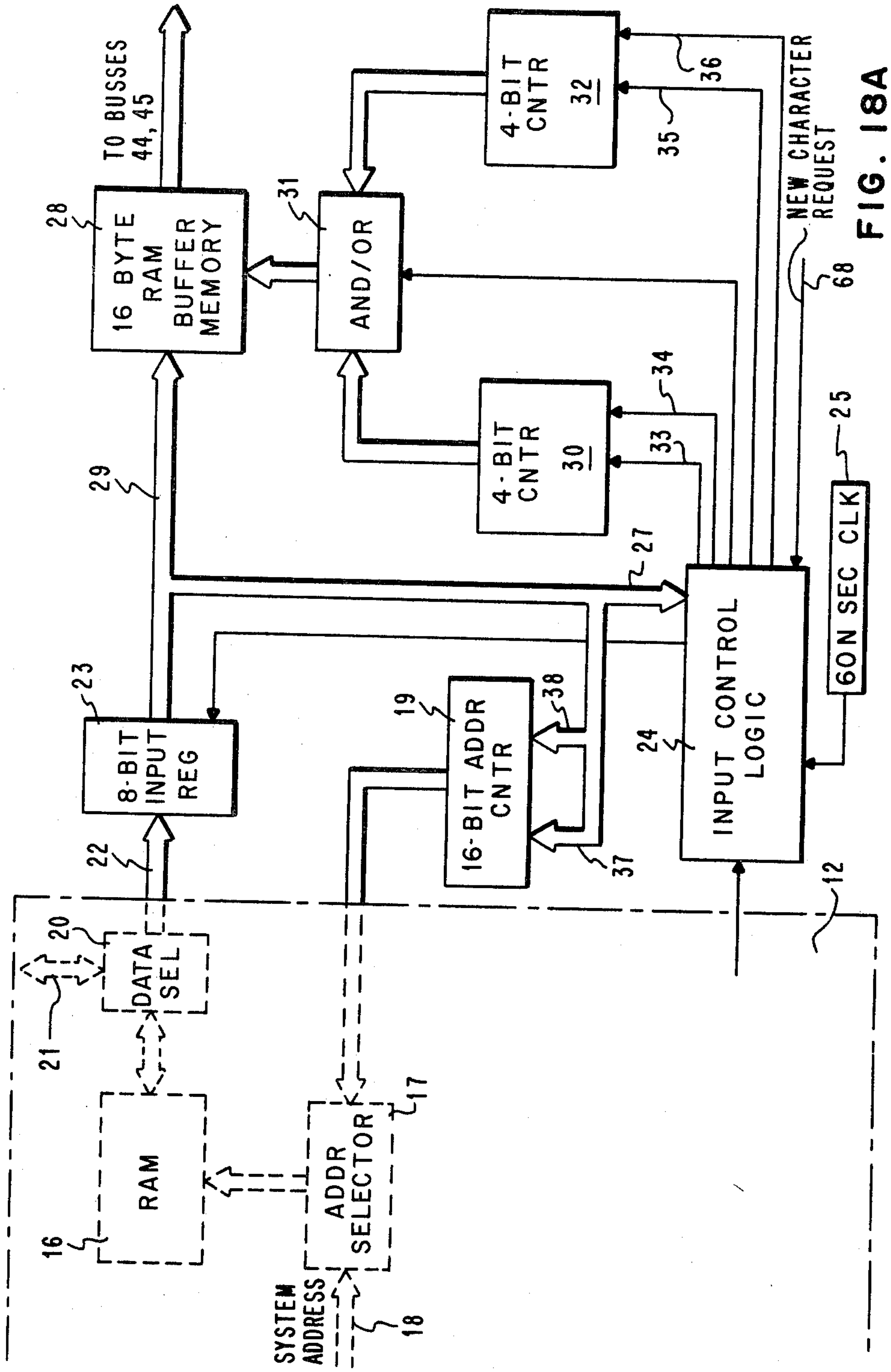
FIGS. 18A and 18B are logic diagrams showing the control logic for a CRT subraster scan display which may be used in the implementation of that embodiment of the present invention in which the character positional information and the coded character information required to generate the characters are respectively stored in two separate storage means.
Figure 18B:
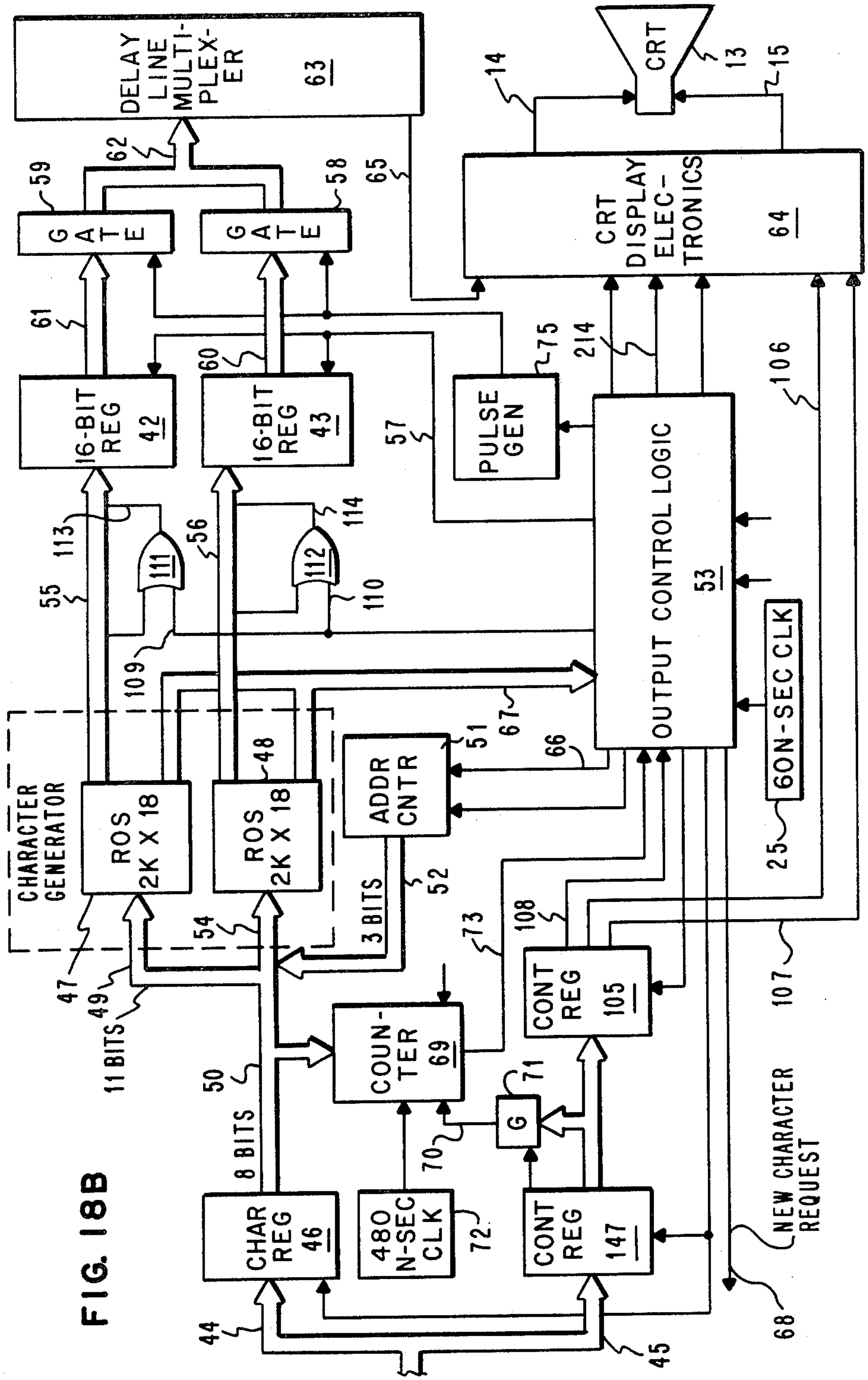

With reference to FIGS. 18A and 18B, the alphanumeric data to be displayed on the CRT 13 is stored in random access memory (RAM) 16 in the microprocessor 12 which controls the text processing system. In the present embodiment RAM 16 contains the coded data representations of a block or page of alphanumeric characters to be displayed on the CRT 13 in a sequence of storage positions spatially corresponding to the positions of the characters in the page or block to be displayed on the CRT. RAM 16 also contains control codes determining character positions as well as characteristics of the displayed characters such as underscore. During the main deflection along a line 14 in the CRT scan shown in FIG. 15, address selector 17, FIG. 18A, will request a signal from address counter 19 which is indicative of the position of the scanning beam along main deflection line 14, FIG. 15. Address counter 19 under the control of input control logic 24 controls the sequences of character data from RAM 16 so that a sequence of character data is provided to the character generation means to be hereinafter described in a sequence spatially corresponding to CRT 13 display. The purpose of address selector 17, FIG. 18A, is to multiplex positional signals from address counter 19 with all other addresses being fed to RAM 16 along microprocess system buss 18 or other unrelated microprocessor functions. Systems data select means 20 perform a similar multiplexing function with respect to data being removed from the microprocessor RAM, i.e., data relating to other unrelated functions of the microprocessor system is output via systems data buss 21 while the bit of data which is indicative of the character to be displayed at the position indicated by counter 19 on CRT 13 is output along buss 22 to input register 23 while address counter 19 is incremented by one. The input control logic 24 which operates under a 60 nano-second high frequnecy clock 25 examines the byte of data in register 23 via buss 27 in order to determine whether the byte is an instruction code, control code or character code. For example, an instruction code would be: "LOAD ADDRESS COUNTER 19 WITH NEXT TWO BYTES". In such a case, control logic 24 will direct the next two bytes into counter 19 via busses 37 and 38. On the other hand, if it is determined that the byte in register 23 is a control code, it is passed through buss 29 to RAM buffer memory 28. By definition of the system, a character code bit will follow a control code. Thus, everytime a control code byte is sensed and loaded into buffer 28, the next byte which must be a character code byte is taken from the RAM and loaded into buffer 28 which can store up to 8 bytes of control code and 8 bytes of character code.

The 16 byte buffer memory 28 is of particular value in display systems wherein the spacing allotted to the characters is variable dependent upon the width of the character. For example, the "W" may occupy almost twice as much space as an "I". Thus, it is conceivable that during a particular scan of the CRT traversing a whole line, up to 20% more characters may be packed into a particular line if it contains many narrow characters than in another line containing primarily wider characters. Since the CRT scan is constant, i.e., the time for the main deflection to traverse a line 14 is constant, it follows that in a line having up to 20% more characters, considerably more data handling associated with character generation has to be accomplished in a same period of time as the data handling for a line containing less characters. The 16 byte buffer memory 28 provides a storage reservoir of character and control code data which may then be input to the character generation means of the present system in synchronization with the main deflection along scan line 14 of FIG. 15.

The buffer memory 28 is under the control of counter 30 which serves as the input pointer to positions in buffer memory 28 through gate 31 and counter 32 which serves as the output pointer to positions in buffer memory 28 through gate 31. Input and output counters 30 and 32 are controlled by input logic control means 24 respectively through clock 33 and clear 34 lines to counter 30 and clock 35 and clear 36 lines to counter 32.

With buffer memory loaded, the apparatus is at a stage from which the alphanumeric character to be displayed along a given display line may be refreshed in synchronization with the CRT scanning means. Before going into the description of how the characters are generated in synchronization with the scanning of the CRT, the CRT scanning cycle will be briefly described with reference to FIGS. 15 and 16. The video is controlled by the character generator in synchronization with a scan which involves a main deflection horizontal scan along lines 14 of FIG. 15 together with a micro-raster vertical scan as shown in FIG. 16. In other words, as the beam traverses horizontally along line 14, it is being subrastered vertically along line 39 as shown in detail in FIG. 16. For purposes of illustration, we will consider the scan format in FIGS. 15 and 16 for characters of fixed proportions, i.e., the same size character box is allotted irrespective of the width of the character. In the illustration of FIG. 16, the timing relationship of the horizontal escapement unit versus the vertical scan lines in the micro-raster is such that the beam is deflected so that 8 vertical scan lines at 300 nano-seconds per scan line is the equivalent of 5 escapement units at 480 nano-seconds per escapement unit. In other words, each character box 40, 40' or 40" is 5 escapement units wide and the vertical scan 39 is divided into 8 scan lines. As will be explained hereinafter in detail, it is during this vertical scan in a particular character box that the character generator by selectively turning on the desired combination of video line units 41 will cause the alphanumeric character to be displayed and cyclically refreshed. In the example shown in FIG. 16, the letter "N" is "painted" in character box 40 while character box 40' is a blank, i.e., no video line units are turned on, and character box 40" contains a portion of the alphanumeric character "F".

Getting back to the stage in FIGS. 18A and 18B at which buffer memory 28 is loaded with the character code and control code bytes of the characters to be displayed, there will now be described the generation of alphanumeric characters on the display in synchronization with the scanning of the CRT. Immediately after the loading of scan line register 42 and 43 with data which represents that portion of the last previous character being displayed along the last two (seventh and eighth) scan lines in the character box for said character, the control code and the character code for the next character are respectively loaded from the buffer memory through busses 44 and 45 into character register 46 and control register 147. Using the time sequence previously described, this will permit about 600 nano-seconds for the retrieval from read only store memories (ROS) 47 and 48 in the character generator of the video pattern along the next two scan lines which will be the first two scan lines in the next character. At this point let us assume that the character and control data which have been loaded respectively into registers 46 and 147 represents a normal character to be displayed without any control code changes. The address to read only stores 47 and 48 will comprise 11 bits applied through busses 54 and 49. These 11 bits comprise 8 bits from the character register 46 output along buss 50 and 3 bits from address counter 51 output along buss 52. Under the control of the output control logic 53 which controls the character generation operation in much the same manner as input control logic 24 controls the routing of character control and instruction data from the processor RAM, the first two scan lines of the selected character pattern are respectively output from read only stores 47 and 48 along busses 55 and 56 to scan registers 42 and 43 which have been enabled for loading by a signal from output control logic 53 along line 57. Scan line register 42 will store data indicative of the turned-on video unit or dot pattern in the first scan line of the pair while scan register 43 will store data indicative of the pattern of turned-on video units or dots in the second scan line.

In order to turn-on selectively the units in a given scan line in accordance with the data stored in either scan line register 42 or 43, pulse generator 75 under the control of output control logic 53 provides a gating pulse respectively to either gate 58 associated with scan register 43 or gate 59 associated with scan register 42. In this manner pulse generator will enable gate 58 for example, every 15 nano-seconds to pass data from scan line register 43 input along buss 60 or will enable gate 59 to pass data from scan line register 42 input along buss 61. Thus, as a particular scan line is being traversed, data representative of whether a video unit or dot is to be turned-on will be transmitted through buss 62, delay line multiplexer 63 which provides the requisite interface delays and line 65 to standard CRT display electronics 64 in which it is input to Video Control Unit 200 (FIG. 19) which applies the corresponding video pattern which will appear on CRT 13. Upon the completion of the first two scan lines of a given character box, output control logic 53 increments address counter 51 with an appropriate signal along line 66 to change the three bit input from address counter 51 along buss 52 and thereby cause read only stores 47 and 48 of the character generator to respectively output the next two scan lines for the character box being scanned whereupon upon the above procedure is repeated, after which the address for the next two scan lines in the character box is similarly obtained and so on until all of the eight scan lines upon which the character is to be "painted" are output. The completion of a character will be indicated by a signal along buss 67 from either read only stores 47 or 48 of the character register whereupon output control logic issues a new character request along line 68 to input control logic 24, and input control logic 24 will initiate the previously described procedure for obtaining the next character from microprocessor RAM 16.

CONTROL LOGIC FOR SPATIALLY POSITIONING DISPLAYED CHARACTERS

The control logic of FIGS. 18A and 18B has means for spatially positioning characters stored in a memory such as that of FIG. 4 in which the spatial information is stored in sequence with the sequentially accessible characters. Suppose we have a spacing operation which will be indicated by a space code, i.e., spc (0–255); the value within the parenthesis indicates the number of spaces. In such a case with reference to FIGS. 18A and 18B, suppose we have an indication of spc (150), then the first input from the processor RAM 16 to input register 28 will be the control code indicating a space operation. In such a case, control logic 24 which has examined the data in register 23 via buss 27 makes the determination that we have a space control code. Then, under the direction of input control register 24, the next byte of data which will indicate the number 150 will be passed through buffer memory 28 along with the space control code and will not be loaded into character register 46 but rather will be passed through to space counter 69 which has been enabled through gate 71 and line 70 by the space control code in control register 147. Counter 69 is then decremented by 480 nano-second clock 72 (the escapement speed). As long as there is a count remaining in counter 69, a signal is applied via line 73 to output control logic 53 which in turn will inhibit the regular pulsing of pulse generator 75. Thus, there are no signals from pulse generator 75 to enable gates 58 and 59; and the scan lines remain blank, i.e., no characters are displayed. When counter 69 zeros out, a zero signal is applied via line 73 to output control logic 53 and pulsing by the pulse generator 75 is resumed to thereby permit the "painting" or display of the next sequential character at the position which has been tabbed to.

With respct to FIGS. 17A and 17B, there will now be described another embodiment of the present invention wherein the memory organization providing the sequentially accessible storage means for storing the coded data representations of the displayed characters is divided into two memory units; a matrix storing means which stores only data representative of the positions of the displayed characters as shown in FIG. 2 wherein the positions of the "1" bits are spatially correspond to the positions of the respective alphanumeric characters being displayed in the CRT and a second storage means as shown in FIG. 3 in which the coded representations of the displayed characters are stored in the same sequence as the positional storage locations in FIG. 2 and consequently in the same sequence as the characters being scanned on the display. In the sequentially accessible memory illustrated in FIG. 3, there is no positional information; this is provided solely by the positional matrix of FIG. 2.

Figure 17A:
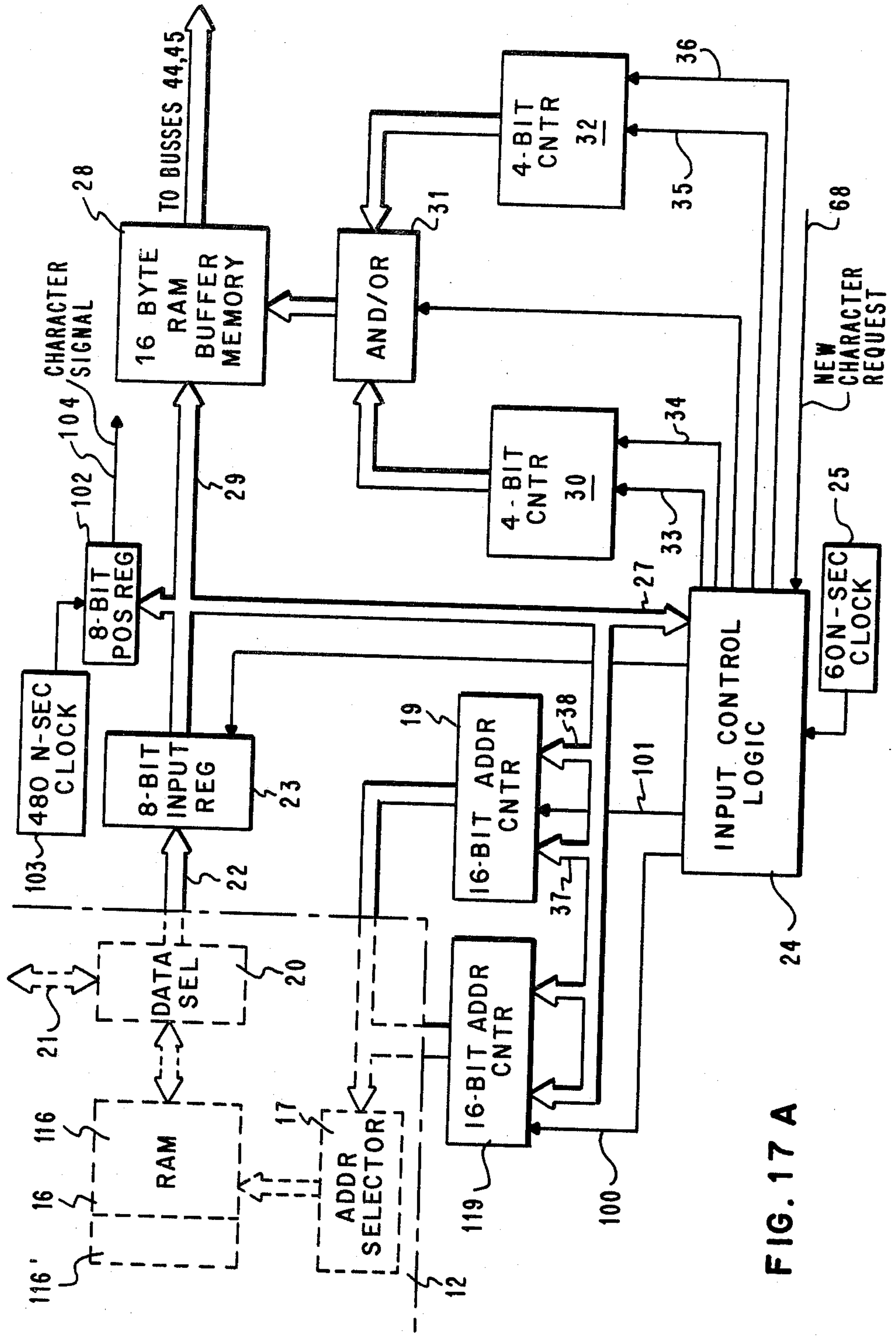
FIGS. 17A and 17B are logic diagrams showing the control logic for a CRT subraster scan display of the present invention in which both the character positional information as well as the information necessary to generate characters are stored in a unitary sequential memory.
Figure 17B:
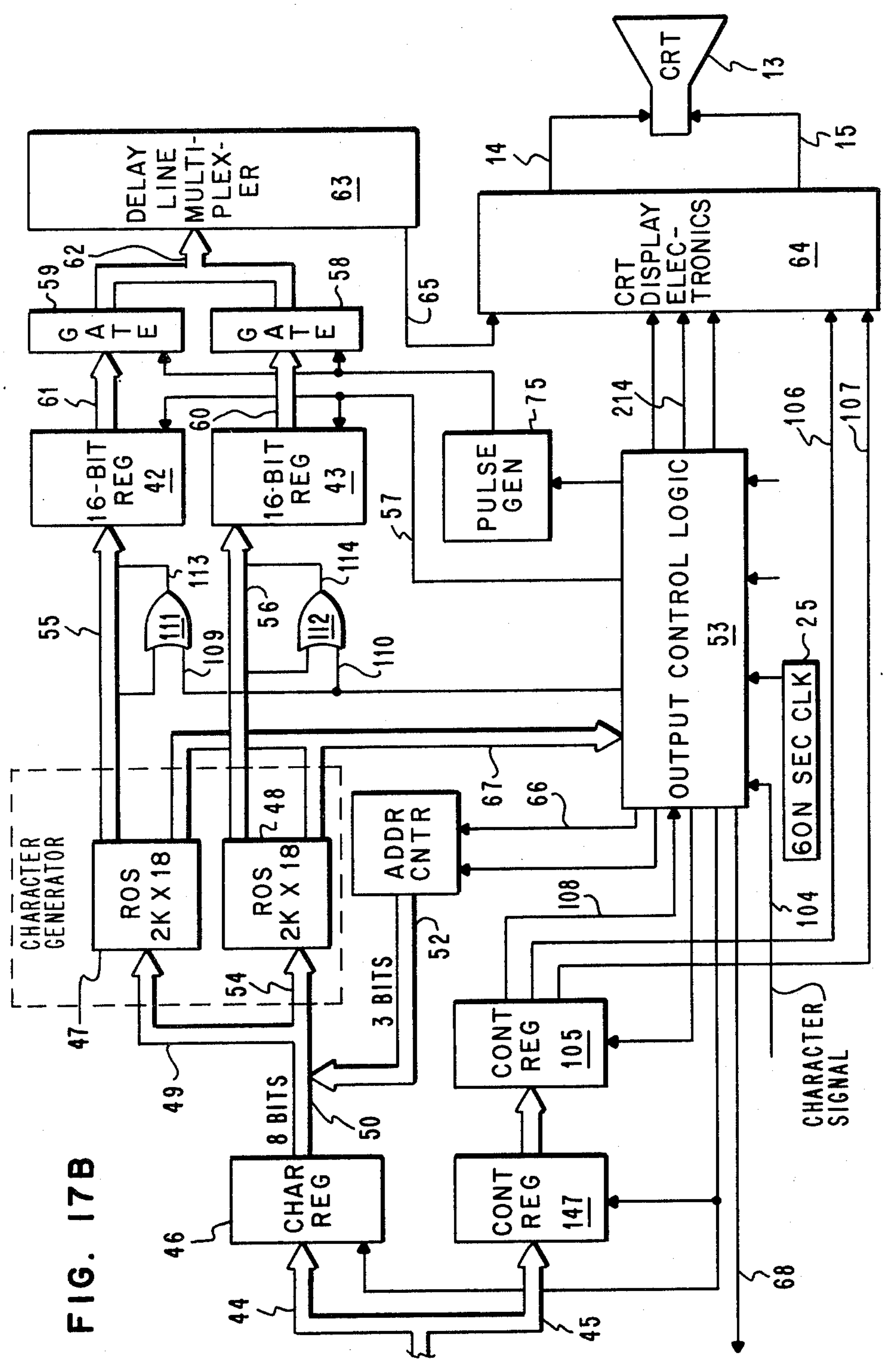

FIGS. 17A and 17B represent a modification of the control logic of FIGS. 18A and 18B in order to spatially position the displayed characters using the two coacting storage means instead of a single storage means. Because of the identity of most of the functions of the control logic set forth in FIGS. 17A and 17B with those previously described with respect to FIGS. 18A and 18B, the same numerals will be used in FIGS. 17A and 17B to designate the functional units which remain unchanged, and the operation of these will not be again described in detail. The present description will be concerned primarily with the additional or modified functional units. In FIG. 17A, a portion 116 of RAM 16 contains a stored positional matrix of the type illustrated in FIG. 2. Another portion 116' of RAM 16 contains a character code data as shown in FIG. 3 in sequential order without any positional information. With reference to FIGS. 17A and 17B, let us consider how the positions in which the character and character control data stored sequentially in section 116' of the RAM 16 are displayed by the character generation system in FIG. 17B in the proper spatial position. In order to address RAM 16, there is an additional address counter 119 which like address counter 19 is under the control of input control logic 24 which through enabling lines 100 and 101, respectively, may activate either address counter 119 which addresses bytes of data in positional memory 116 or address counter 19 which in the manner previously described with respect to FIGS. 18A and 18B addresses the character and character code data sequentially stored in memory section 116'. Irrespective of the address counter selected, the appropriate section of RAM 16 is addressed in the manner previously described (FIG. 18A) through address selector 17 and the data output from RAM 16 is output through data select 20 to input register 23 as previously described.

With a selected appropriate programming sequence, input control logic 24 has the capability of enabling address counter 19 through line 101 to address control and character data section 116' and to thereby load the 16 byte buffer memory 28 with a sequence of control code and character code data as previously described. This data stands ready to be applied to the character generator and then to the scan line registers 42 and 43 under the control of output control logic 53 in the manner previously described with respect to FIG. 18B. However, in the embodiment of FIG. 17A and 17B, the position at which each sequential character is to be displayed is determined by the input control logic 24 enabling address counter 119 through enabling line 100 to address additional matrix 116. Input logic control 24 directs positional data output from positional matrix 116 through input register 23 to positional register 102. In this addressing sequence, the next byte of positional data from the positional matrix 116 (as illustrated in FIG. 2) has been transferred to position register 102. Then, 480 nano-second clock 103 (the escapement speed) counts down the eight bits of data loaded in positional register 102 (each representing a character position) until a "1" bit is reached which determines that a character is to be displayed at the character position represented by the "1" bit. Upon this occurrence, a character signal is output on line 104 to output control logic 53 (FIG. 17B). On the other hand, when the byte of data transferred from matrix 116 to register 102 is all "0's", the addressing procedure is repeated and the next sequential byte of data is transferred to positional register 102 from positional matrix 116, and the clocking sequence repeated until a "1" bit produces a signal on line 104 until a signal is received on line 104. Output control logic 53 will inhibit the regular pulsing of pulse generator 75 (the operation of which has been previously described with respect to FIG. 18B); consequently no gating pulses will be applied to either gate 58 or 59, respectively, associated with scan registers 43 and 42; thus, the scan lines will remain blank and no characters will be displayed at the particular character position represented by the "0's" in the byte of data from positional matrix 116. When a "1" bit in the positional matrix in position register 102 finally produces a character signal on line 104, output control logic 53 will activate pulse generator 75 which in turn will activate gate 58 and 59 to permit the next character stored in ROS 47 and ROS 48 of the character generator to be "painted" or displayed on CRT 13 in the position represented by the "1" in the byte of data from positional matrix 116 on CRT display 13 in the manner previously described with respect to FIG. 18B.

From the above descriptions of the system of FIGS. 18A, B as compared to that of FIGS. 17A–B, it will be noted that with respect to the spatial positioning of the generated character, the combination of positional register 102 and clock 103 in FIG. 17A–B processes spatial data from matrix 116 in a manner similar to counter 69 and clock 72 of FIG. 18A, B processing the spatial data stored together with character and control code data in the system.

LOGIC FOR CONTROL CODE PROCESSING

With respect to FIGS. 18A, B, let us now consider how the present system handles a control code designation associated with a particular character. While this illustration will deal with the embodiment of FIGS. 18A and 18B, the hardware involved in this function is substantially identical in the system of FIGS. 17A and 17B. As previously mentioned, when there is no control information associated with a particular character, i.e., no underscore or half indexing, etc., when the particular character code designation is stored in character register 46, a blank control code will accompany the character and be stored in register 147 but have no effect. On the other hand, when there is a definitive control code associated with the character, that control code will be stored in register 147. For example, let us assume that the control code is the BUS (begin underscore) as shown before the letter "I" in FIG. 11, this function will be loaded into display control register 105 from control register 47. With such a control code in display control register 105, during the subsequent displaying of the characters "I" and "S" (FIG. 11), control register 105 will provide a signal on line 108 to output control logic 53 which will provide underscore signals along lines 109 and 110, respectively, to gates 111 and 112 to activate these gates to provide an underscore signal along lines 113 and 114, respectively, to scan line registers 42 and 43 along with the scan line patterns provided these registers on busses 55 and 56 whereby a portion of the underscore pattern will be at the bottom of each scan line pattern to produce the underscore under "IS" as shown in FIG. 8. Then, the end underscore (EUS) which follows the letter "S", FIG. 11, will cause control register 105 to turn off the underscore on line 106.

When the control codes half-index and reverse half-index accompany a particular character, the control register 105 controls the CRT display electronics 64 by signals on lines 106 and 107 to respectively half-index and reverse half-index the displayed character.

DISPLAY OF PROPORTIONALLY SPACED ALPHANUMERIC CHARACTERS

Figure 12:
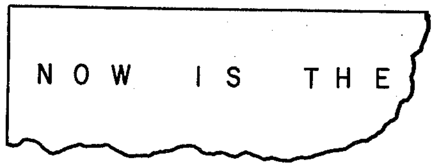
FIG. 12 is a diagrammatic illustration respectively corresponding to the diagrammatic illustration of FIG. 1 except that the alphanumeric display of FIG. 1 is a proportionally spaced.
Figure 13:
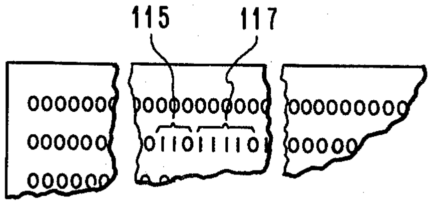
FIG. 13 is a diagrammatic illustration respectively corresponding to the diagrammatic illustration of FIG. 2 except that the alphanumeric display of FIG. 2 is proportionally spaced and consequently the positional matrix of FIG. 13 is arranged in accordance with escapement rather than character position.
Figure 14:
FIG. 14 is a diagrammatic illustration respectively corresponding to the diagrammatic illustration of FIG. 4 except that the alphanumeric display is the sequentially accessible storage means storing the data represented in FIG. 12.

With reference to FIGS. 12, 13 and 14, the display of proportionally spaced alphanumeric characters will be described. By way of illustration, FIG. 12 shows part of the CRT on which part of a page proportionally spaced alphanumeric data is displayed. By proportionally spaced data, we mean that the data is uniformally spaced irrespective of the width of the character. To achieve this, the character boxes, i.e., the escapement width dedicated to the particular character at the particular display position must be of varying width. In the previously described display operations the character boxes at each display position were five escapement units of 480 nano-seconds each in width; with proportional spacing, the width of the character boxes may be any where from three to seven of such 480 nano-second escapement units. Thus, when using a positional matrix to store the spatial arrangement of the characters, a matrix as illustrated in FIG. 13 must be used wherein instead of having a single bit position represent a whole character position, each escapement unit is represented by a bit. Where there are no characters, we will merely have a string of zeros until the next escapement position wherein the presence of a "1" indicates the beginning of a character. With such an arrangement, each space may be represented by a string of five zeros representing five escapement units while the character box dedicated to narrow characters may comprise three escapement units: two one bits followed by a zero bit as for example the three bits, 115 FIG. 13 which represents the position of a narrow character "I" in the display of FIG. 12 or the four one bits followed by a zero, designated 117 in the positional matrix FiG. 13 which designates the position of the character "S" in the display, FIG. 12. In this arrangement, the character like "W" would be represented by seven escapement units: six ones and the zero bit; the latter bit serves as a delimiter so that the characters may be resolved.

With such proportionally spaced characters of varying size, the display controlled logic previously described with respect the FIGS. 17A and 17B operates essentially in the manner described with the exception of course that the character signal on line 104 from position register 102 into output control logic 53 represents that a portion of a character is to be displayed at that respective escapement position. Thus, for example, with a character having a character box of six escapement positions, a string of five ones would be input to control logic 53 through signal line 104 while a narrow character occupying only three escapement positions would result in a string of two ones being input through line 104 to control logic 53. So long as the string of ones for the particular character is applied to control logic 53, post generator will be active to provide the previously described signals enabling gates 58 and 59 to transmit the scan line patterns from scan line registers 43 and 42. In order to maintain synchronization between the escapement position and the character being displayed, the character generator, i.e., ROS 47 and 48 will produce the character pattern in a lesser number of scan lines for a narrow character and a greater number of scan lines for a wide character.

In embodiments wherein the spatial or positional data is stored in combination with the character data as in the storage means for the system set forth in FIGS. 18A and 18B, the operation is even more straight forward. Four spaces between characters, space counter 69 merely counts the number of escapement positions between the last displayed character and the next character to be displayed at which point a signal is given over line 73 to output control logic 51 to activate both generator 75 and permit the character as defined in ROS 47 and ROS 48 of the character generator to be displayed in a selected number of scan lines dependent of course on character width.

CRT DISPLAY ELECTRONICS

Figure 19:
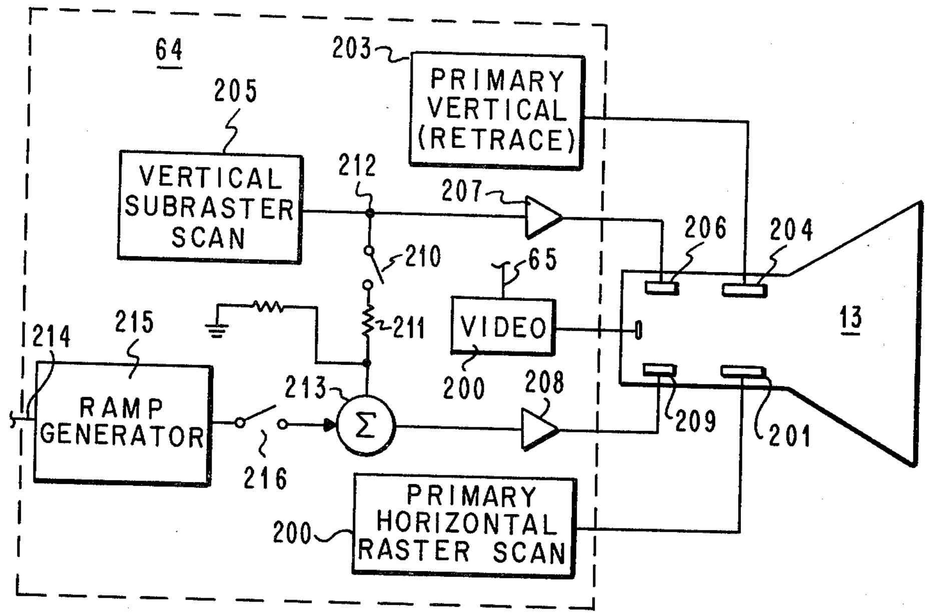
FIG. 19 is a logic diagram of pertinent portions of the CRT Display Electronics of FIGS. 17B and 18B.

The CRT display electronics 64, FIGS. 17B and 18B is shown in some detail in FIG. 19. Primary horizontal raster scan circuit means 200 apply a voltage to deflection means 201 to effect the primary raster scan path 14 (FIG. 15) while primarily vertical deflection circuitry 203 applies a voltage to CRT deflection means 204 to provide vertical displacement during the retrace step of the raster shown in FIG. 15. Vertical subraster scan circuitry 205 applies through driver amplifier 207 a signal to cause deflection means 206 to impose the vertical scan line subraster pattern 39 (FIG. 16) upon the primary horizontal deflection path 14 to produce the subraster scan pattern previously described with respect to FIG. 16. In this subraster, the horizontal deflection during the retrace of these vertical scan lines is of course provided by the primary horizontal deflection means 201 controlled by primary horizontal scan circuitry 200.

During this scanning, the previously described data signals representative of whether or not a video dot will be turned on is transmitted to the CRT display unit over line 65 which is applied to video control circuitry to provide the conventional modulation of the scanning beam which results in the sequence of dots or video display units 41 (FIG. 16) forming the alphanumeric character.

It should be noted from FIG. 16 that the vertical scan lines 39 are not exactly vertical; these vertical scan lines and consequently the alphanumeric characters formed along these lines tilt slightly to the right which of course is the direction of the primary horizontal deflection of the beam along primary horizontal raster path 14. Thus, there is a constant horizontal velocity of the beam which prevents an exact vertical scan. While this condition is certainly tolerable and in no way interferes with the reading of the alphanumeric display, this condition may be readily compensated for by switching in the optional circuitry shown in FIG. 19. A portion of the voltage signal which is being applied from vertical subraster scan unit 205 to vertical deflection means driver 207 is applied to driver amplifier 208 and consequently to compensating horizontal deflection means 209 by closing switch 210. This results in the voltage level at node 212 being reduced across resistor 211 which acts as a voltage divider and applies the selected reduced voltage level to driver 208 passing through summing means 213 which serves a summing function to be hereinafter described with respect to horizontal stretching of the displayed character but in the present simple operation serves no function. Upon the application of said voltage level, driver 208 causes horizontal deflection means 209 to buck the primary horizontal deflection provided by deflection means 201 during the display of a character. This results in a sufficient slow down of the horizontal deflection during character formation that the vertical scan lines 39 (FIG. 16) are substantially vertical. It should be noted that switch 210 was merely illustrative of the option of incorporating such corrective apparatus into the basic display hardware. Thus, if this correction is desired in the operation, switch 210 would of course be replaced by continuous connection.

Figure 20:
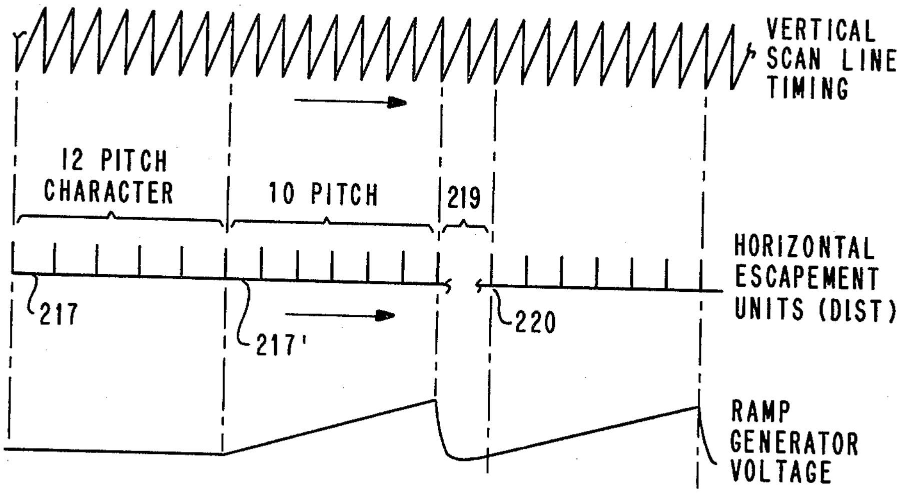
FIG. 20 is a timing diagram to show the effect of a ramp generator voltage to speed up horizontal scan of the CRT.

In accordance with a further aspect of the present invention, the apparatus has the capability of altering the pitch of a single character or a single word on a line or an entire line without in any way changing character generation logic or the coded representation for the various characters stored in the character generator. When a change in pitch is desired, a signal may be applied to output control logic 53 (FIGS. 17B and 18B) to any communication means, i.e., through a terminal connection, whereupon output control logic 53 issues a signal over line 214 which is applied to ramp voltage generator 215 in CRT control electronics, FIG. 19. Let us assume for purposes of illustration that the apparatus normally displays 12 pitch characters, and upon the application of a signal on line 214, 12 pitch characters are to be displayed. Ramp generator 215 in FIG. 19 is shown connected to summing means 213 through optional switch 216. (Again, this switch is merely intended to show that these means for differentiating the pitch are optional; thus, if incorporated, there would be a continuous connection.) The operation of ramp generator 215 and its effect on speeding up the primary horizontal raster scan will be better understood when FIG. 19 is considered in combination with the timing diagram shown in FIG. 20. As FIG. 20 illustrates, timing operation is such that when 12 pitch characters are being displayed (let us assume that these narrow characters are the normal width), the primary horizontal deflection is such that as set forth hereinabove horizontal scan traverses five escapement units (distance) 217, FIG. 20, for every eight vertical subraster scan lines. This relationship is illustrated in the case of the initial 12 pitch character shown in the timing diagram of FIG. 20. Should it be then desired to change to a 10 pitch or wider character, the signal on line 214 from the control logic 53 (FIGS. 17B and 18B) is applied to the ramp generator 215 of FIG. 19 causes an increase voltage as shown to be applied through voltage summing means 213 to driver 208 which controls secondary horizontal deflection means 209. Since, in our illustration in FIG. 20, the vertical scan lines are substantially vertical and do not tilt, we may assume that the previously described compensating means provide a voltage level signal through resistor 211 and summing means 213 also to be applied to driver 208. The two voltage levels are summed with the voltage from ramp generator 215 in summing means 213; the net effect of the voltage level applied to secondary horizontal deflection means 209 from driver 208 is sufficient to increase the speed of the horizontal displacement to the level shown in FIG. 20 for a 10 pitch character so that six horizontal escapement units 217' are traversed for each eight vertical scan lines; because of the compensating effect of the other voltage from node 212 applied to summary means 213, the vertical scan lines are prevented from tilting.

It is important to note that despite the speeding up of the escapement in the larger, i.e., 10 pitch characters, the time that it takes the overall horizontal raster to make a single horizontal pass 14 (FIG. 15) should remain unchanged irrespective of the pitch of the characters formed therein. Consequently, upon the completion of each larger 10 pitch character, the ramp generator voltage immediately dropped to zero, slope 218 (FIG. 20). Therefore, while the beam is traversing the character at a higher than normal rate when forming the wider 10 pitch character, it retraces slightly at the end of this wider character so that time elapses before the beam is in the correct position for the beginning of the next character. This time lapse is signified by break 219 in the distance travelled by the escapement so that substantially no distance is traversed before the next character is initiated by point 220. With this time lapse, the average time for forming the wider 10 pitch character is substantially the same as that for forming the normal narrow 12 pitch character.

While the invention has been particularly shown and described with reference to a particular embodiment, it will be understood by those skilled in the art that various changes in form and detail may be made without departing from the spirit and scope of the invention.

What is claimed is:

1. A cathode ray tube display system for displaying a block comprising a plurality of alphanumeric characters arranged in a plurality of character lines having cyclic refresh means wherein each whole character is refreshed before the next succeeding character is refreshed comprising:

means for continuous repetitive raster scanning of the cathode ray tube in a raster of horizontal passes, each traversing a whole one of said character lines, and each of said passes comprising a continuous subraster of vertical scan lines wherein each character position in said character line being traversed is scanned by a group of said vertical scan lines, and means for modulating the light intensity along the vertical scan lines of each of said groups to selectively provide an alphanumeric character at the position being scanned by said group, said alphanumeric characters having varying widths and said groups having a variable number of scan lines dependent on the width of the alphanumeric character to be formed from the group.

2. The cathode ray tube display of claim 1 wherein said means for modulating the light intensity selectively provide a sequence of dots in the group of vertical scan lines at a character position to form an alphanumeric character.

3. The cathode ray tube display system of claim 1 further including means for varying the heights of the vertical scan lines in a group forming an alphanumeric character in order to vary the character height.

4. The cathode ray tube display system of claim 3 wherein said means for varying heights of the vertical scan lines include means for varying the heights of the vertical scan lines in at least two groups in one character line to form at least two alphanumeric characters of different heights in said character line.

5. A display system for displaying on a cathode ray tube display a block comprising a plurality of alphanumeric characters arranged in a plurality of character lines having cyclic refresh means wherein each whole character is refreshed before the next succeeding character is refreshed comprising:

means for sequentially storing coded data representations of said displayed characters in a sequence of storage positions corresponding to the positions of said characters in said displayed block, means for continuous repetitive raster scanning of the cathode ray tube in a raster of horizontal passes, each traversing a whole one of said character lines, and each of said passes comprising a continuous subraster of vertical scan lines wherein each character position in said character line being traversed is scanned by a group of said vertical scan lines, means for sequentially accessing the coded data representations for each character to be displayed from said storage means in synchronization with said raster scanning means traversing the position at which said character is to be displayed, means responsive to said accessed data for applying to said cathode ray tube display signals representative of the whole character to be displayed at a character position prior to the movement of said raster scanning means to the next character position, and means responsive to said applied signals for modulating the light intensity along the vertical scan lines of each of said groups to provide said displayed character at said position, whereby each whole character in said block is refreshed before the next succeeding character is refreshed, said alphanumeric characters having varying widths and said groups having a variable number of scan lines dependent on the width of the alphanumeric character to be formed from the group, and said means for applying signals representative of the whole character also apply signals indicating the number of scan lines in the group forming said character.

* * * * *